July 1, 1941.  R. F. BEAN  2,247,798
SHAVER
Filed Feb. 15, 1939
Fig.1.
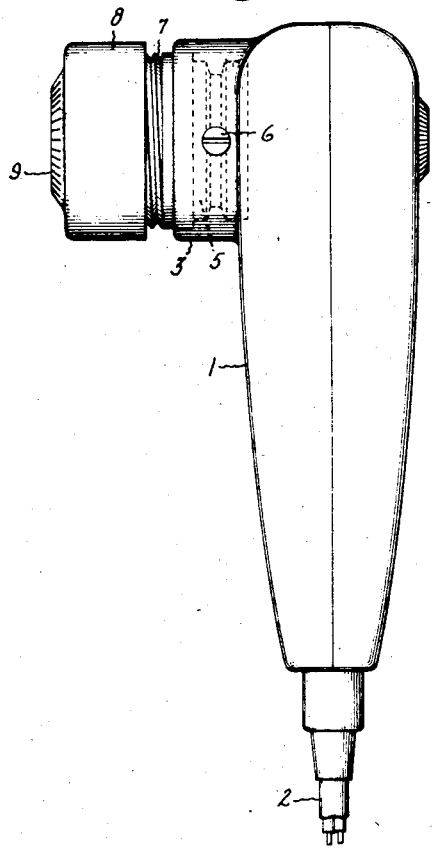
Fig.2.
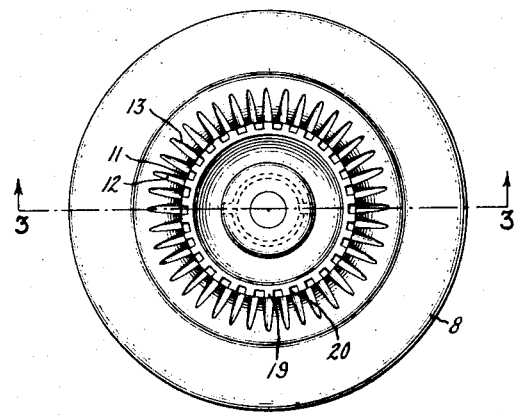
Fig.3.
Fig.4.
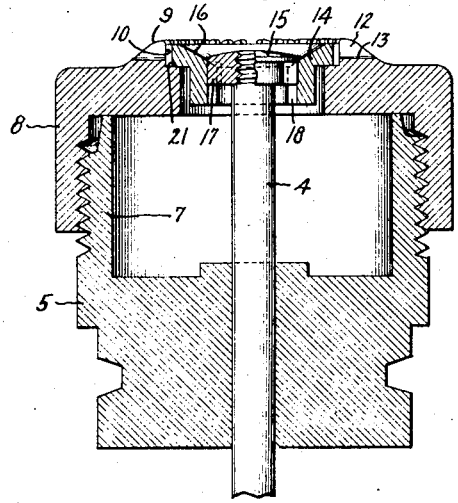
Inventor:
Robert F. Bean,
by Harry E. Dunham
His Attorney.

Patented July 1, 1941

2,247,798

UNITED STATES PATENT OFFICE 2,247,798

SHAVER

Robert F. Bean, Bridgeport, Conn., assignor to General Electric Company, a corporation of New York Application February 15, 1939, Serial No. 256,517

5 Claims. (Cl. 30—43)

The present invention relates to shavers of the type having a shearing head with hair receiving openings and a cooperating movable cutter for shearing hair entering the openings.

The object of my invention is to provide an improved construction and arrangement in shavers of this type, and for a consideration of what I believe novel and my invention attention is directed to the following description and the claims appended thereto.

In the accompanying drawing, Fig. 1 is a side elevation of the shaver embodying my invention; Fig. 2 is a front view of the shearing head; Fig. 3 is a sectional elevation of the shearing head taken on line 3—3 of Fig. 2; and Fig. 4 is a sectional elevation of a modification.

Referring to the drawing, there is shown a shaver having an elongated casing 1 housing an electric motor which is connected to a conductor cord 2 led in through the lower end of the casing. On the front of the casing at its upper end is a cylindrical boss 3 through which the motor shaft 4 projects. The motor shaft is journaled in a bearing block 5 fixed in the boss 3 by a set screw 6. Projecting from the bearing block is an integral cylindrical sleeve 7 on which is threaded a cup-shaped shearing head 8. On the end face of the shearing head is an annular rounded projection 9 which serves as the face contacting surface of the head. At the inner edge of the projection 9 is a cylindrical shearing surface 10 which comprises a surface of revolution about the axis of the shaft 4 and which extends axially or transversely from the face containing surface 9. The shearing surface comprises alternate teeth 12 and slots 11 formed by elongated radial grooves 13 in the projection 9. The grooves are widest at the outer portions and taper inwardly toward and terminate at the shearing surface. The axial depth of the grooves is sufficient to accommodate the longest hairs to be sheared. Although the grooves are shown as radial, it is sufficient that the grooves extend transversely of the shearing surface. The projecting portion 9 has its greatest height adjacent the shearing surface 10 and tapers gradually into the end of the head. This results in a blunt face contacting surface comprising the end surfaces of the teeth 11 between the grooves 13. These surfaces are of sufficient area to prevent discomfort.

The shearing head cooperates with a rotatable cutter 14 held on the motor shaft by a nut 15 threaded thereon and having chamfered lower edges engaging inclined surfaces 16 on the cutter. The driving connection between the shaft and cutter is established by keys 17 projecting from the underside of the nut into grooves 18 in the cutter. At the outer edge of the cutter is a cylindrical cutting surface bearing against the cutting surface 10 on the shearing head and perpendicular or transverse to the face contacting surface. The cutting surface comprises alternate teeth 19 and slots 20. The axial length of the teeth and slots is somewhat greater than the axial depth of the grooves 13. The radial depth of the slots 20 is substantially equal to the minimum width of the slots 12, which, in the present construction, is of the order of .020". The lower surface of the cutter bears on a shoulder 21 in the cutting head. The outer end of the cutting surface of the cutter is a few thousandths of an inch below the outer end of the shearing surface on the cutting head. There is, therefore, no danger of objectionable contact of the cutter with the skin. Yet the cutter may extend very close to the skin since there is no intervening metal. The contact of the cutter with the skin is further avoided by the inclined surfaces 16 which extend inwardly so as to prevent possible irritating contact with the cutter.

In the use of the razor, the head is moved back and forth over the skin, the hairs entering the elongated grooves 13 and being guided toward the cooperating shearing surfaces on the cutter and head. Hairs projecting across the cooperating cutting surfaces are either sheared between the adjacent surfaces of the teeth 11 and 19 or are cut by a sawing action of the cutter teeth 19. Since the cutting surfaces extend to within a few thousandths of an inch of the outer end of the teeth 11, the hairs are cut very close to the skin surface. It should be noted that the cutting surfaces extend edgewise or transverse to the skin and that there is no metal between the outer ends of the cutting surfaces and the skin. Due to the high speed of rotation of the cutter the severed hairs are thrown outward so that the shaver is self-cleaning. In the construction illustrated, the shearing head and cutter have different numbers of teeth so that the openings between the teeth in the cutting head are not opened and closed simultaneously.

In the modification shown in Fig. 4 the casing 1 is provided with an integral cylindrical projection 22 having a spherical surface 23 providing a seat for a self-aligning bearing 24 for the motor shaft 4. The bearing is held in the seat by a circular plate 25 pressed into a recess 26. The plate 25 has a spherical seat 27 which engages the inner edge of the self-aligning bearing. A lubricant-saturated felt washer 28 rests in a recess 29 surrounding the bearing and is held therein by the plate 25. The outer end of the motor shaft 4 is provided with a squared portion 30 which slidably fits into a socket 31 in a cutter 32. The cutter has a frustro-conical cutting surface 33 which bears against a complementary surface 34 on a cutting head 35 threaded on the projection 22. The cutting surface of the cutter is urged against the cutting surface of the head by a coil spring 36 arranged around the cutter hub 37 and between the cutter and the washer 38 bearing on the shoulder 39 of the shaft. The spring 36 maintains uniform contact pressure between the cutting surfaces and compensates for wear. The outer or face contacting surface 40 of the cutting head is rounded as in the previously described construction and has radially extending grooves 41 therein providing alternate teeth and slots in the surface 34. The shape of the grooves 41 is substantially identical with the shape of the grooves 13 in the previously described construction except that the grooves 41 extend deeper into the head at the outer edge 42. The cutting surface of the cutter comprises teeth 43 and slots 44. The inner surface of the teeth 43 flares inwardly at a sharp angle so that the teeth are in effect triangular. The outer ends of the teeth extend within a few thousandths of an inch of the face contacting surface.

The operation of the modification is the same as that of the previously described construction. The modification has the additional advantage that the cutting surfaces are maintained in uniform contact at all times due to the pressure of the spring 36 and the movement of the motor shaft permitted by the self-aligning bearing. The outer ends of the cutter teeth, the only portions which might come into objectionable contact with the skin, are pointed and, accordingly, present a smaller surface.

What I claim as new and desire to secure by Letters Patent of the United States is:

1. In a shaver, a stationary cutting head having a blunt face contacting surface of substantial area and an arcuate shearing surface at one edge thereof extending transversely away from said face contacting surface, hair receiving grooves in said face contacting surface having a depth substantially equal to the length of the hair to be cut and extending transversely to and terminating at said shearing surface and forming alternate teeth and slots therein, a cutter rotatable on an axis perpendicular to said face contacting surface and having an exposed outer end adjacent said face contacting surface and having an axially extending cutting face cooperating with said shearing surface to shear hair projecting through said slots, and means for rotating the cutter.

2. In a shaver, a rotatable cutter having an exposed outer end and an axially extending cutting surface comprising alternate teeth and slots formed by grooves extending axially from the outer end of the cutter, a stationary cutting head surrounding the cutter having a shearing surface cooperating with the cutting surface and having a blunt face contacting surface of substantial area at its outer end extending transverse to the axis of the cutter, hair receiving grooves in the face contacting surface having a depth substantially equal to the length of the hair to be cut and extending transversely to and terminating at the shearing surface and providing alternate teeth and slots therein, and means for rotating the cutter.

3. In a shaver, a stationary cutting head having a blunt face contacting surface of substantial area, a cutter rotatable about an axis transverse to said face contacting surface and having an exposed outer end, cooperating frustro-conical shearing surfaces on the cutter and head extending axially from and flaring inward beneath said face contacting surface, hair receiving grooves in said face contacting surface having a depth substantially equal to the length of the hair to be cut and extending transverse to and terminating at the shearing surface of the head and forming alternate teeth and slots therein, and means for rotating the cutter.

4. In a shaver, a stationary cutting head having an annular blunt face contacting surface of substantial area, a cutter rotatable about an axis transverse to said face contacting surface and having an exposed outer end, axially extending shearing surfaces of revolution respectively on the outer edge of the cutter and on the inner edge of the head presented edgewise to said face contacting surface, grooves in said face contacting surface having a depth substantially equal to the length of the hair to be cut and extending transversely to and terminating at the shearing surface of the head and forming alternate teeth and slots therein, axially extending grooves in the shearing surface of the cutter forming alternate teeth and slots therein, and means for rotating the cutter.

5. In a shaver, a stationary cutting head having a blunt face-contacting surface of substantial area, a cutter rotatable about an axis transverse to said face and having an exposed outer end, shearing surfaces on the cutter and head presented edgewise to said face contacting surface, the outer end of the cutter shearing surface extending substantially to the outer end of the head shearing surface and the outer end surface of the cutter radially within the cutter shearing surface flaring axially inward, hair receiving grooves in the face contacting surface having a depth substantially equal to the length of the hair to be cut and extending transverse to the head shearing surface and forming alternate teeth and slots therein, axially extending grooves in the cutter shearing surface forming alternate teeth and slots therein, and means for rotating the cutter.

ROBERT F. BEAN.